United States Patent
Gyugyi

[15] 3,707,666
[45] Dec. 26, 1972

[54] UNITY INPUT DISPLACEMENT FACTOR FREQUENCY CHANGER

[72] Inventor: Laszlo Gyugyi, Penn Hills, Pa.

[73] Assignee: Westinghouse Electric Corporation, Pittsburgh, Pa.

[22] Filed: Nov. 12, 1971

[21] Appl. No.: 198,215

Related U.S. Application Data

[63] Continuation-in-part of Ser. No. 84,796, Oct. 28, 1970.

[52] U.S. Cl. ......................... 321/5, 321/7, 321/69 R
[51] Int. Cl. ............................................. H02m 5/22
[58] Field of Search ......................... 321/5, 7, 69 R

[56] References Cited

UNITED STATES PATENTS

| | | | |
|---|---|---|---|
| 3,170,107 | 2/1965 | Jessee | 321/7 X |
| 3,178,630 | 4/1965 | Jessee | 321/7 |
| 3,419,785 | 12/1968 | Lafuze | 321/5 X |
| 3,431,483 | 3/1969 | Lafuze | 321/7 |
| 3,470,447 | 9/1969 | Gyugyi et al. | 321/7 |
| 3,493,838 | 2/1970 | Gyugyi et al. | 321/7 |

Primary Examiner—William M. Shoop, Jr.
Attorney—F. H. Henson et al.

[57] ABSTRACT

The invention relates to a frequency changer (or cycloconverter) system employing conduction controlled bilateral switches operating in a controlled switching mode to maintain a unity input displacement factor for the frequency changer system independent of load power factor and output voltage. The input displacement factor, which is often referred to as the input power factor, of the frequency changer system is defined to be the angle between the input, or source, voltage and the fundamental component of the input current drawn by the frequency changer system.

3 Claims, 19 Drawing Figures

UNITY INPUT DISPLACEMENT FACTOR FREQUENCY CHANGER

CROSS REFERENCE TO RELATED APPLICATIONS

This application is a continuation in part of application Ser. No. 84,796, entitled Unity Input Displacement Factor Frequency Changer, filed Oct. 28, 1970. This application is also related to a second cofiled continuation in part application Ser. No. 198,283 of application Ser. No. 84,796.

BACKGROUND OF THE INVENTION

In conventional direct AC to AC frequency changer systems the input displacement factor of such systems is dependent upon the power factor of the load at the output. The relationship between the input displacement factor and the load power factor may be linear or non-linear depending upon the operating principle of a particular frequency changer. For example, the naturally commutated (or phase controlled) frequency changer always has a lagging input displacement factor independent of the load power factor. The input displacement factor of the naturally commutated frequency changer is thus non-linearly related to the load power factor such that a unity power factor load, or resistive load, is seen by the power source as an inductive load, and a purely capacitive load or a purely inductive load as seen by the power source as a pure inductance. In the case of the force commutated mode of operation of a frequency changer, as described in U.S. Pat. No. 3,493,833 entitled Static Frequency Converter with Novel Voltage Control, which is assigned to the assignee of the present invention, there is a direct linear relationship between the load power factor and the input displacement factor, i.e., the input displacement factor is equal to the load power factor.

In many applications it would be advantageous to have a frequency changer system with a load-independent, unity input displacement factor such that the input power source would be required to supply only the resistive component of the load current, i.e., the current portion which is actually consumed. In applications where the input power is produced by a local generator this would result in a weight and size reduction for the generator and electrical cables, as well as providing improved overall efficiency. In other applications such as high power AC motor drives, a frequency changer system having a unity input displacement factor would reduce installation and operation expenses.

SUMMARY OF THE INVENTION

The novel frequency changer systems comprising this invention is a unity input displacement frequency changer system which draws only the resistive component of the load current from the power source regardless of the power factor of the load. The unity input displacement factor characteristic of the frequency changer system is maintained for any load ranging from a pure capacitance to a pure inductance. In other words the rated inductive or capacitive load current can be supplied without actually drawing any fundamental current from the input power source.

The unity input displacement factor mode of operation of a pair of converters comprising a frequency changer system is described and illustrated with reference to two independent configurations. In a first configuration two converters employing bilateral switches being supplied from the same input power source are operated such that the one of the converters transfers back to the input terminals the actual load power factor while the other converter transfers back an inverted representation or mirror image of the actual load power factor. The combination of the actual and inverted load power factor at the input terminal results in a zero reactive load current flow through the input power source and thus establishes a unity input displacement factor for the frequency changer system.

In the second configuration each of the converters exhibits a unity displacement factor and the combination of the two converters results in a substantial reduction in input current and output voltage distortion while maintaining a unity input displacement factor. The output voltage waveforms of each of the converters are generated by appropriately phase modulating the firing angles of the bi-lateral switches in each converter with respect to the phases of the supply voltages. The modulation is controlled so as to produce complementing output wave shapes from the converters with each exhibiting the same mean output voltage. This is achieved by maintaining the sum of the firing angles of the two converters equal to 180°.

It is noted that this method of basic control is essentially the same as that used for controlling the firing angles of a naturally commutated frequency changer. Thus, existing control techniques, such as the sine wave crossing method, or integral lining control method can be used to obtain the proper phase modulation. The similarity ends at this point, however, in that the operation of the frequency changer system comprising this invention is completely different from that of the naturally commutated frequency changer. The naturally commutated frequency changer consists of a positive conducting converter and a negative conducting converter such that each converter normally operates only during one-half cycle of the output current and remains idle during the other half cycle. The two converters of the naturally commutated frequency changer can be maintained in continuous conduction only if a circulating current is allowed to flow between them via the input supply source. In either of these modes of operation, however, the input displacement factor of the naturally commutated frequency changer is less than unity.

The frequency changer system comprising the second configuration consists of two converters employing bilateral switches. Each of the converters is capable of conducting both positive and negative current. Thus both converters are in conduction during the total output cycle, each one supplying half of the load current. There is no significant circulating current between the converters and both converters exhibit unity displacement factors at their input.

In both configurations where two converters are employed the total rms distortion of the input current as well as the rms distortion of the output voltage is significantly reduced.

The invention will become readily apparent from the following exemplary description in connection with the accompanying drawings.

DESCRIPTION OF THE PREFERRED EMBODIMENT

The novel configurations for achieving unity input displacement factor for frequency changer systems independent of load power factor and, input and output frequency, will be described separately. FIGS. 1–8 correspond primarily to the discussion of one configuration, while FIGS. 8–11, which are further extensions of FIGS. 1–8, correspond to the second configuration.

Figure 1:
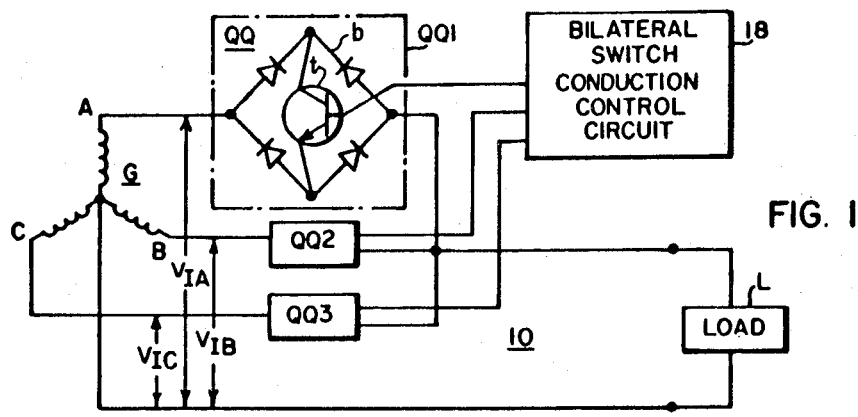
FIG. 1 is a basic schematic illustration of a frequency changer utilizing bi-lateral switching elements.

Referring to FIG. 1 there is illustrated schematically a frequency changer 10 comprised of generator G, bi-lateral switches QQ, and electrical load L. The bi-lateral switches QQ are typically represented as a diode bridge $b$ in combination with a transistor $t$. The ON-OFF control of the transistors provided by control circuit 18 in combination with the current conducting paths provided by the diode bridges enables the bi-lateral switches QQ to conduct current in both the forward and reverse directions. The current conduction to load L from the generator phases A, B and C provided by the controlled conduction of the bilateral switches QQ1, QQ2 and QQ3, respectively, develops the individual phase voltages across the load L.

According to the basic mode of operation of such a frequency changer as described in U.S. Pat. Nos. 3,148,323 issued to Blake et al. Sept. 8, 1964; 3,170,107 issued to Jessee Feb. 16, 1965; and 3,493,838 issued to Gyugyi et al. Feb. 3, 1970. These U.S. Patents, the latter two being assigned to the assignee of the present invention, are incorporated herein by reference. Each of the bilateral switches QQ are allowed to conduct for a fixed period of time T, such that the input voltages corresponding to the input generator phases A, B and C are successively connected to the load L for the same timer interval T, resulting in the fabrication of a predominantly sinusoidal output waveform across the load L. It is shown in the above-identified U.S. Pat. No. 3,148,323 that the fundamental component of the generated output voltage has a frequency $f_o = |f_p 13 - |f_I$ where $f_p$ equals 1/T, 3 represents the number of bilateral switches and corresponds to the pulse number of the converter and $f_I$ is the supply frequency. This expression indicates that there are two possible values of $f_p$, one greater and one less than $3f_I$ which will result in the same output frequency. If $f_p/3$ is greater than $f_I$, than the output frequency, $f_o$ is given by:

$$f_o = f_{p1}/3 - f_I \quad (1)$$

If $f_p/3$ is less than $f_I$, then $f_o$ takes the following form $$f_o = f_I - f_{p2}/3 \quad (2)$$

Figure 2A:
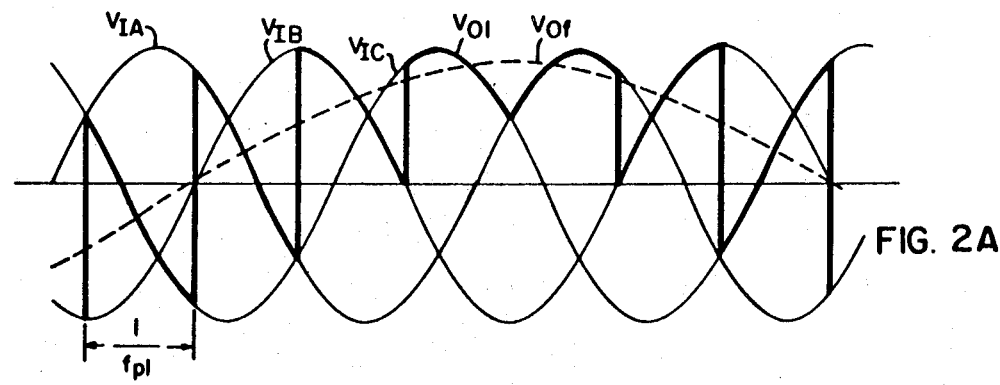
FIGS. 2A and 2B are waveform illustrations of two switching modes of operations for the bi-lateral switching elements of FIG. 1.
Figure 2B:
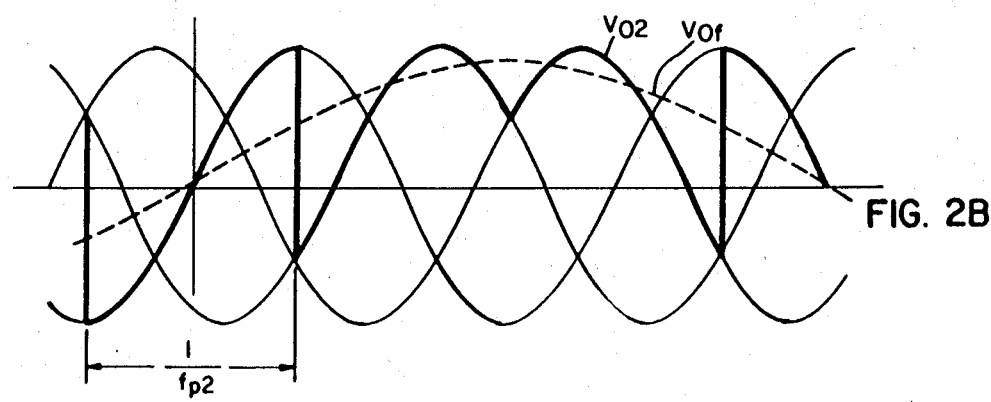

The output voltage waveshapes corresponding to the switching frequencies $f_{p1}$ and $f_{p2}$ respectively are shown in FIGS. 2A and 2B. It can be shown that the fundamental components of the two waveforms are identical and correspond to the following expressions:

$$V_{of} = (3\sqrt{3}/2\pi)\hat{V}_I \sin(2\pi f_o t) \quad (2)$$

where $f_o$ corresponds to either equation (1) or (2), and $V_I$ is the amplitude of the input voltage.

Assume now for the purpose of discussion that the load L connected across the output terminals of frequency changer system 10 is reactive thereby resulting in a phase angle displacement $\phi$ between the output fundamental voltage $V_{of}$ and the load current $I_{of}$ wherein the current expression is:

$$I_{of}(t) = \hat{I}_{of} \sin(2\pi f_o t - \phi) \quad (4)$$

It can be shown that the phase relationship between an input phase voltage, i.e., $V_I$, of the generator G and the dominant, or fundamental input current $I_{If}$ drawn by the frequency changer 10 corresponding to the switching frequencies $f_{p1}$ and $f_{p2}$ can be described mathematically as follows: if one of the input phase voltages is expressed as:

$$V_I(t) = \hat{V}_I \sin(2\pi f_I t) \quad (5)$$

then the current $I_{If}$ will be $$I_{If1} = (3\sqrt{3}/2\pi) I_{of} \sin(2\pi f_I t - \phi) \quad (6)$$

when the frequency changer is operated by the switching frequency $f_{p1}$ (i.e., $f_{p1}/3 > f_I$), and the input current will be $$I_{If2} = (3\sqrt{3}/2\pi) I_{of} \sin(2\pi f_I t - \phi) \quad (7)$$

when the frequency change is operated by switching frequency $f_{p2}$ (i.e., $f_{p2}/3 < f_I$). It is observed from the above equations (6) and (7) that while the magnitude of the input current remains unchanged for both switching frequencies ($f_{p1}$ and $f_{p2}$), the phase angle of the input currents corresponding to the respective switching frequencies are opposite.

It can therefore be concluded that if a frequency changer operates at the frequency $f_{p1}$ it will result in an input displacement angle of the frequency changer which is the negative of the load phase angle, and if the frequency changer operates at the switching frequency $f_{p2}$ the resulting input displacement angle will be identical to the load phase angle. The amplitude of the input current at both switching frequencies remains the same.

Figure 3A:
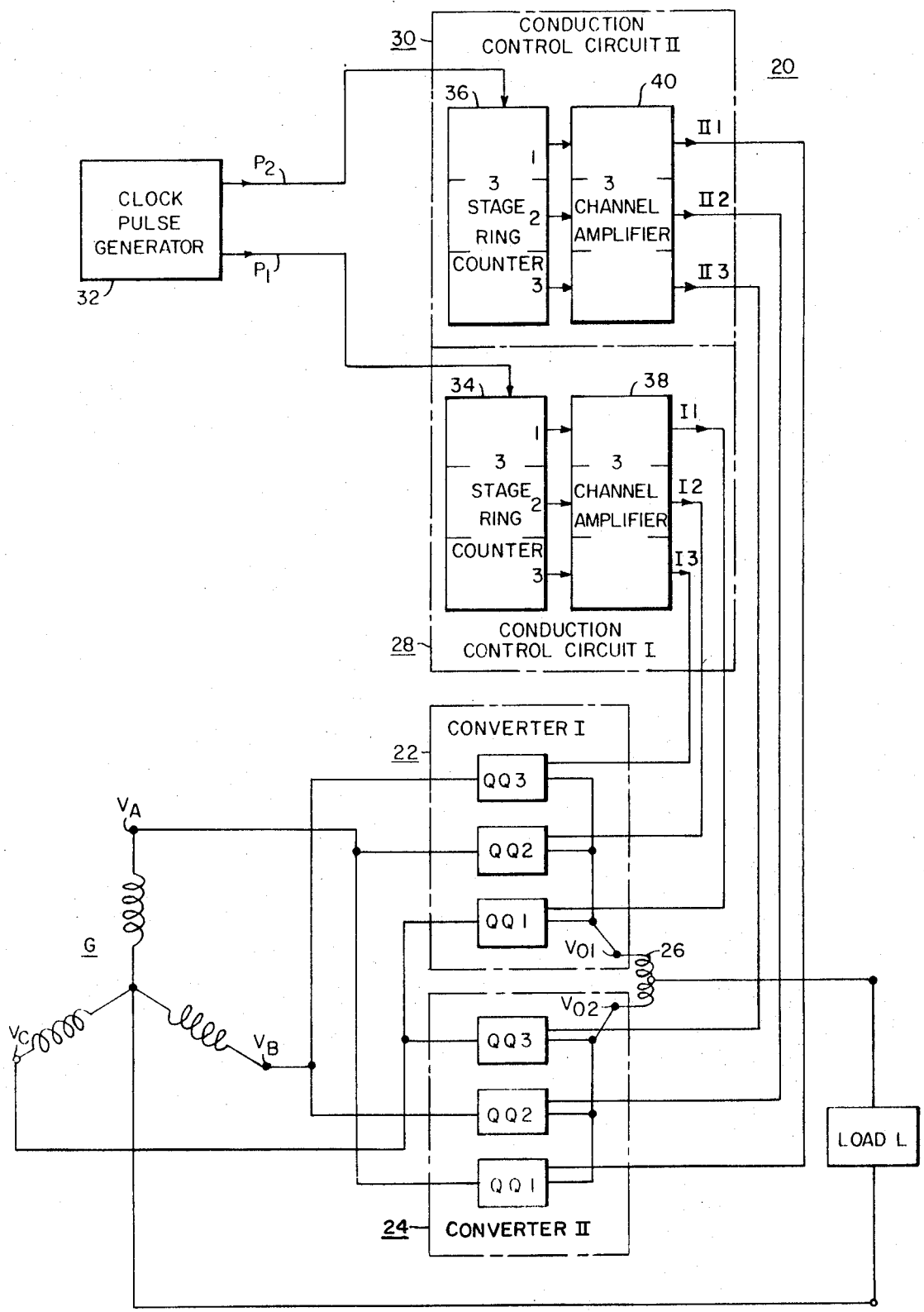
FIG. 3A is a schematic illustration of a frequency converter system utilizing two frequency converters connected in parallel by means of interphase reactor.
Figure 3B:
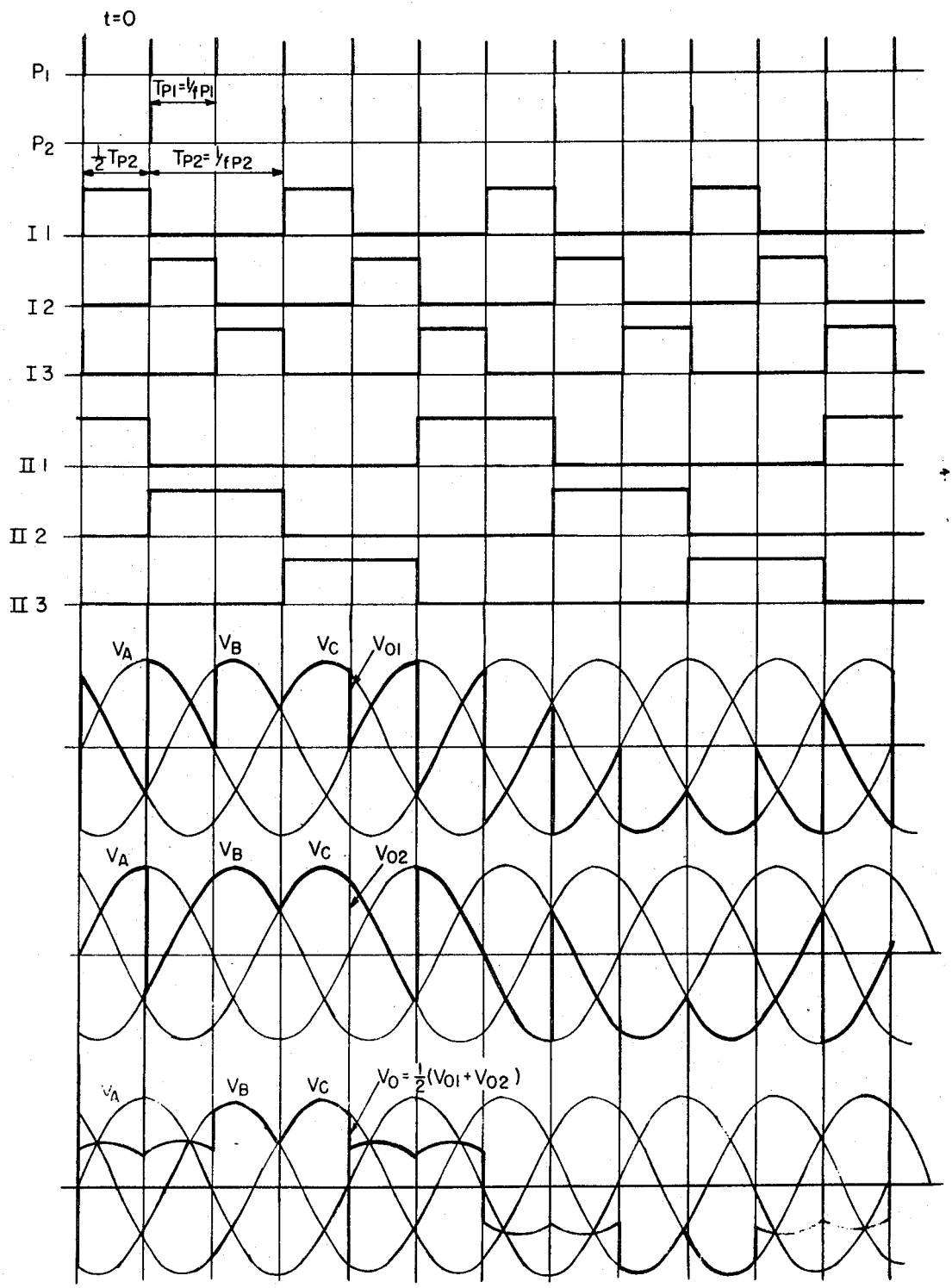
FIG. 3B is a waveform illustration of the operation of the embodiment of FIG. 3A.

The significance of the above relationship of the current and voltage of the frequency changer operating at the switching frequencies $f_{p1}$ and $f_{p2}$ will become more apparent from the following discussion in reference to FIGS. 3A and 3B.

Referring to FIG. 3A there is illustrated a frequency changer system 20 comprised of supply voltage generator G, two converters 22 and 24, the outputs of which are connected in parallel via an interphase reactor 26 to the electrical load L. The ON-OFF conduction of the bilateral switches of converters 22 and 24 are controlled bia conduction control circuits 28 and 30 by clock pulse generator 32.

The operation of the frequency changer system 20 is illustrated by the waveforms (1)-(11) of FIG. 3B.

The clock pulse generator 32 provides two strings of pulses $P_1$ and $P_2$ illustrated in waveforms (1) and (2) respectively, having frequencies of $f_{p1}$ and $f_{p2}$ respectively, as defined by equations (1) and (2). In order to ensure that the fundamental components of the two composite output waveforms $V_{o1}$ and $V_{o2}$ illustrated in wave forms (9) and (10) respectively are in phase, clock pulse wave $P_2$ is shifted by one half of its period time, $\tfrac{1}{2} f_{p2}$, with respect to clock pulse wave $P_1$ as illustrated in FIG. 3B. The phase relationship between the two coordinated clock pulse waves and the supply voltages $V_A$, $V_B$ and $V_C$ is somewhat arbitrary; the one shown in FIG. 3B was chosen for the purpose of clear illustration. The actual generation of clock pulse waves $P_1$ and $P_2$ having the required frequency and phase relationship will be explained later.

Clock pulses $P_1$ and $P_2$ are fed to three-stage ring counters 34 and 36 which develops the ON-OFF conduction control waves. I1, I2, I3 illustrated in waveforms (3), (4) and (5) respectively and II1, II2, II3 illustrated in waveforms (6), (7) and (8) respectively. These control waves are appropriately amplified by two three channel amplifiers, 38 and 40, and then coupled to the control electrodes of the bilateral switches of converters 22 and 24. In the waveform illustrations of FIG. 3B it is assumed that each bilateral switch becomes conductive whenever the corresponding control wave is positive, and it ceases conduction when the control wave is zero.

The above described sequential operation of bilateral switches QQ1, QQ2 and QQ3 of converter 22 and 24 generate output wave shapes $V_{o1}$ and $V_{o2}$ from the input supply waves $V_A$, $V_B$ and $V_C$ as illustrated by waveforms (9) and (10) in FIG. 3B. Since in the above detailed mode of operation, the converter 22 is operated at a switching frequency $f_{p1}13$ and converter 24 is operated at the switching frequency $f_{p2}13$ such that equations (1), (2) and (3) are simultaneously satisfied, i.e. both converters generate an output voltage wave shape with the same fundamental components, it follows that the frequency changer system 20 will generate an output voltage wave shape $V_o$ illustrated in waveform (11) of FIG. 3B, which is the arithmetic means of the constituent waves $V_{o1}$ and $V_{o2}$ as illustrated in waveforms (9) and (10) of FIG. 3B. In this mode of operation, therefore, the fundamental component of output waveform $V_o$ is also defined by equation (3).

While the expression for the fundamental component of the voltage output waveform of the frequency changer system 20 remains the same as the expression for the fundamental component of the voltage output waveform of the frequency changer system of FIG. 1, the fundamental component of the input current for the frequency changer system 20 becomes $$I_{If(1+2)} = (I_{If1} + I_{If2})/2$$
$$= (3\sqrt{3}/4\pi)\hat{I}_{of\,real} \sin(2\pi f_I t) \quad (8)$$

where $I_{of_{real}}$ is the amplitude of the real component of the load current and is defined according to the equation:

$$\hat{I}_{of_{real}} = \hat{I}_{of} \cos \phi \quad (9)$$

It is apparent from equation (8) that the operation of the converters 22 and 24 at the switching frequencies $f_{p1}/3$ and $f_{p2}/3$ respectively isolates the input power source G from the reactive component of the load current thereby establishing a unity input displacement factor for the frequency changer system 20 regardless of load power factor and output frequency.

This novel operation of the combined frequency changers 22 and 24 of FIG. 3A provides an additional benefit in that the total rms distortion in the output voltage waveform is reduced as is apparent from a comparison between the component waveforms of FIG. 3B and the resultant waveform. It has been determined that this rms distortion is reduced by a factor of $1/2\sqrt{2}$.

Figure 4A:
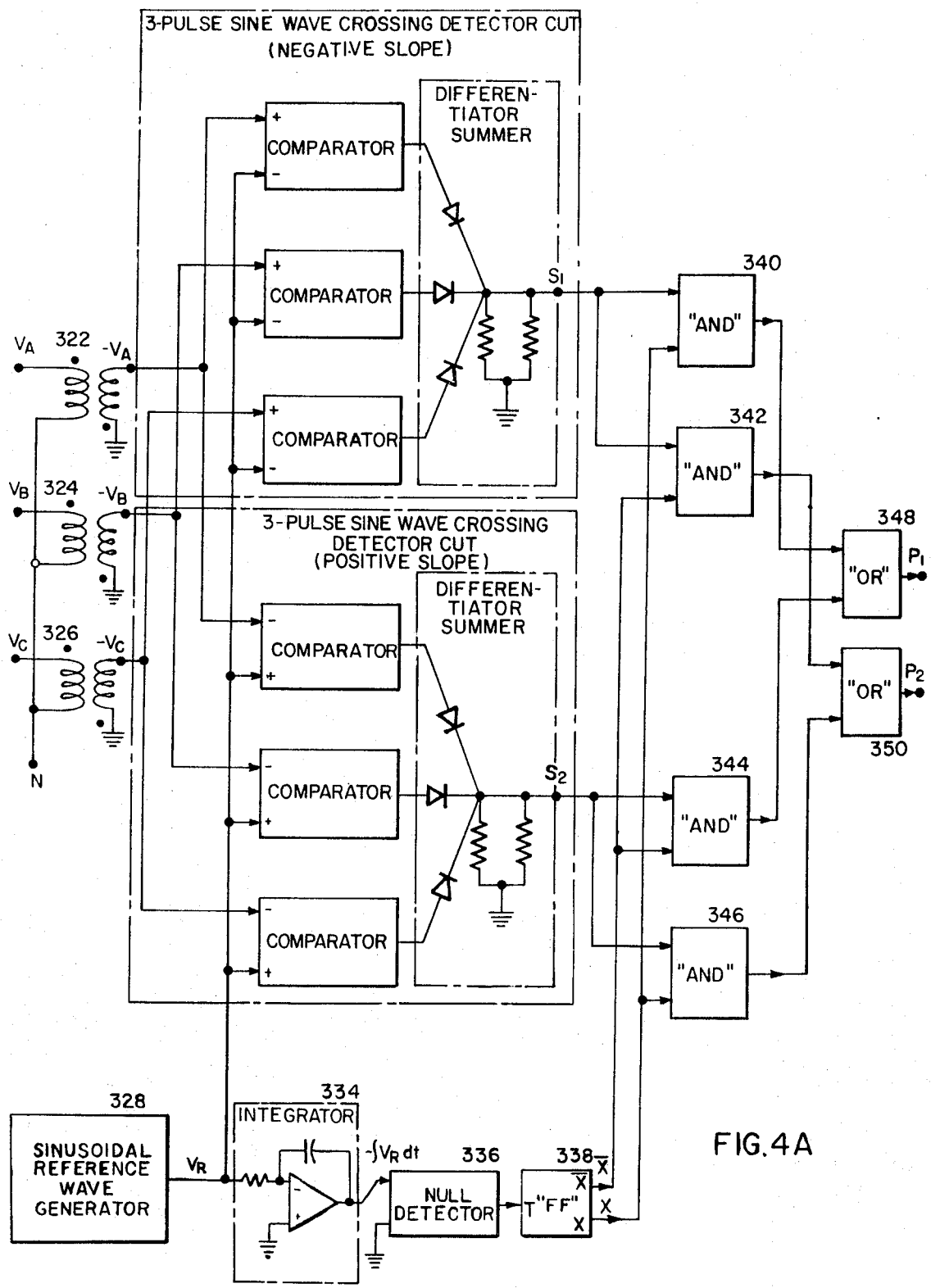
FIG. 4A is a schematic illustration of an embodiment of the clock pulse generator of FIG. 3A.

As was explained above, in the described mode of operation of frequency changer 20 the two clock pulse waves $P_1$ and $P_2$ must have the previously defined frequency and phase relationship. It is obvious that there are numerous ways of implementing the operation of clock pulse generator 32 to produce the series of pulses required to operate the control circuits 28 and 30 in the desired manner. A possible implementation of the clock pulse generator 32, utilizing the well known principles of the sine wave crossing control, is shown in FIG. 4A and its operation is illustrated by the waveforms (1)-(9) of FIG. 4B.

The clock pulse generator is comprised of transformers 322, 324, 326, producing three sinusoidal timing waves which are in antiphase with the supply voltages, a reference generator 328 generating a sinusoidal waveform of the wanted output frequency, three-pulse sine wave crossing detector circuits 330 and 332, an integrator 334, null detector 336, a flip-flop circuit 338, logic AND gates 340, 342, 344 and 346 and logic OR gates 348 and 350.

The operation of the clock pulse circuit 32 may be explained as follows with reference to FIG. 4B.

The three timing waveforms, $-V_A$, $-V_B$ and $-V_C$, are compared to reference wave $V_R$. In the present discussion it is assumed that the amplitude of the reference wave is approximately equal to, but not greater than the amplitudes of the timing waves. At the points of intersection of the reference wave with the negative slopes of the timing waves the three-pulse sine wave crossing detector circuit 330 generates pulses $S_1$; at the points of intersection of the reference wave with the positive slopes of the timing waves the three-pulse sine wave crossing detector circuit 332 generates pulses $S_2$ as illustrated in FIG. 4B. From the sinusoidal reference wave $V_R$, two square waves, X and $\overline{X}$, which are phase shifted by +90° and −90° respectively with respect to $V_R$, are generated by integrator 334 null-detector 336 and flip-flop circuit 338. The desired clock pulse waves $P_1$ and $P_2$ are derived from pulse trains $S_1$, $S_2$ and square waves X, $\overline{X}$ by logic AND gates 340, 342, 344, 346 and OR gates 348, 350 in accordance with the following Boolean equations $$P_1 = S_1 \cdot X + S_2 \cdot \overline{X} \qquad (10)$$

$$P_2 = S_2 \cdot X + S_1 \cdot \overline{X} \qquad (11)$$

Figure 4B:
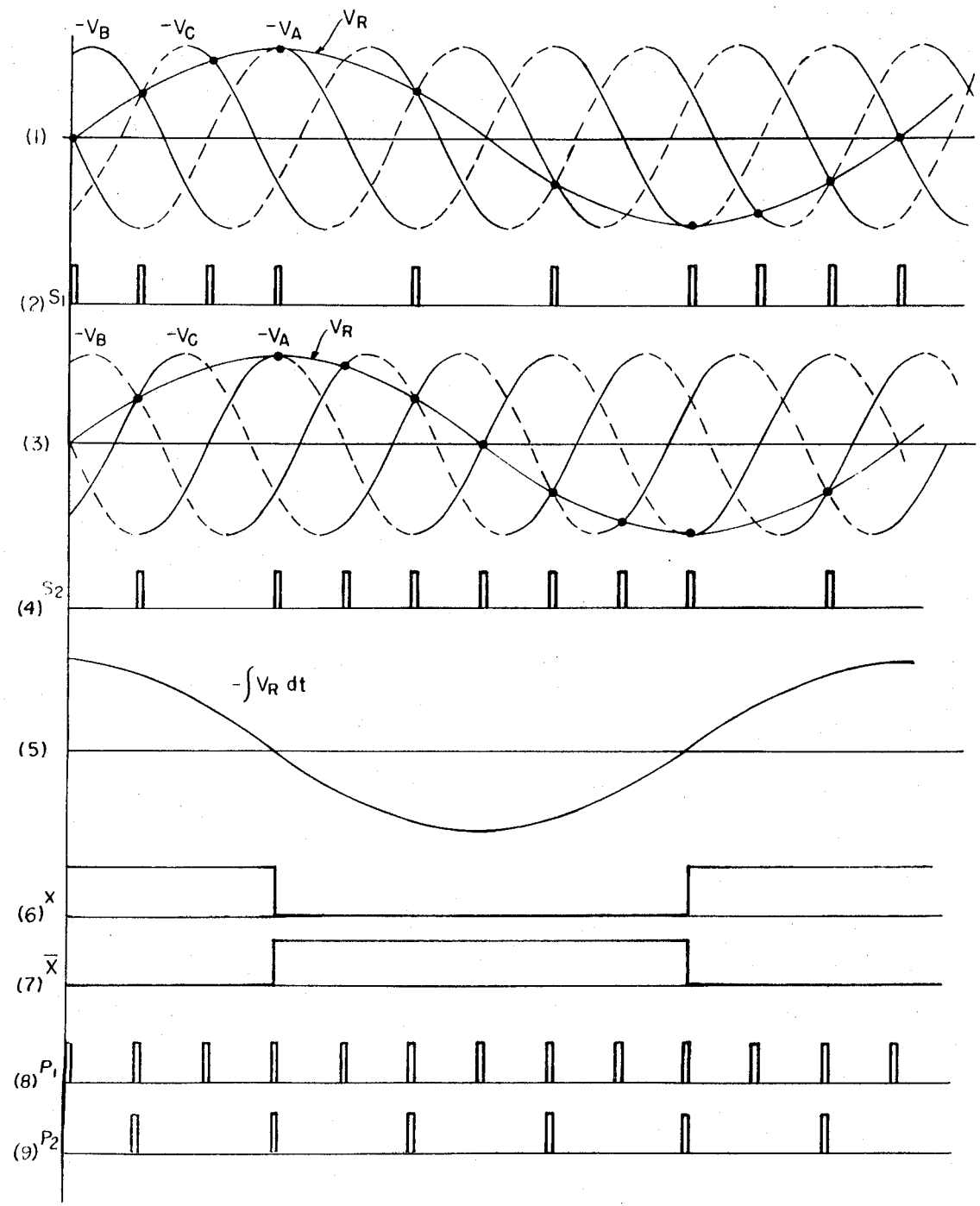
FIG. 4B is a waveform illustration of the operation of the clock pulse generator of FIG. 4A.

The derivation of clock pulse trains $P_1$ and $P_2$ is illustrated in FIG. 4B.

It is to be noted that the above described operation of the clock pulse generator 32 is not restricted to the case of keeping the amplitudes of the reference and timing waves approximately equal. In fact, the amplitude of the reference wave may be arbitrarily decreased with respect to the amplitudes of the timing waves. In this way the amplitude of the generated output voltage wave of the frequency changer system 20 may be varied. It can be shown that the input displacement factor remains unity at any amplitude of the output (or reference) voltage wave. It is further pointed out that the input phase angles of the individual converters i.e. converters 22 and 24) vary as a function of the amplitude of the output voltage wave. However their sum remains zero at all amplitudes of the output voltage, independently of the load phase angle, thus ensuring a unity input displacement factor for the combined converters.

The technique for establishing unity input displacement factors for a frequency changer system described above, whereby two converters are supplied from the same input power source and are operated at different switching frequencies such that one converter reflects the negative of the load phase angle back to the terminals of the input power source and the second converter reflects the load phase angle back to the input power source is applicable to frequency changer configurations other than that illustrated in FIG. 3A.

Figure 5A:
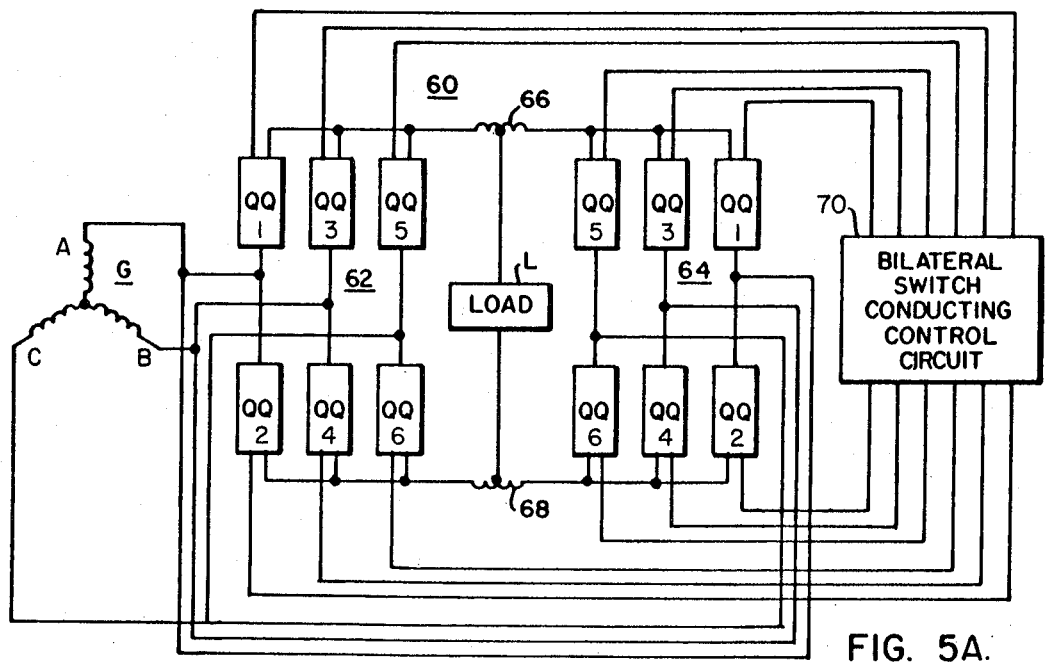
FIG. 5A is a schematic illustration of a six pulse frequency changer system comprised of interphase reactor coupled frequency changers as illustrated in FIG. 3.
Figure 6B:
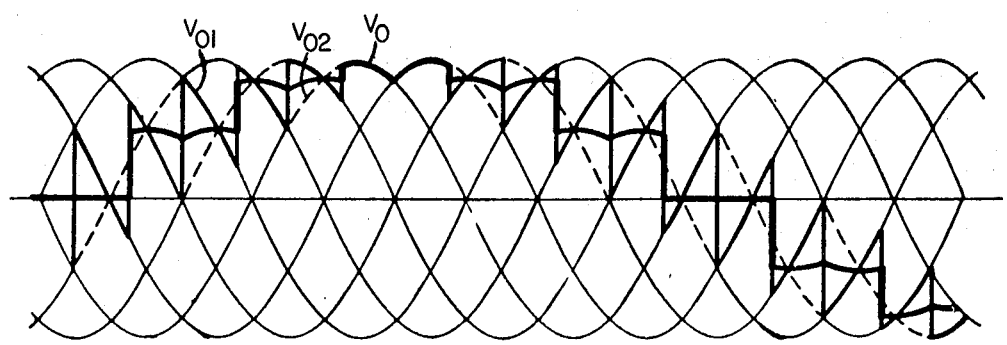
FIGS. 6A and 6B are waveform illustrations of the operation of a frequency changer system of FIGS. 5A and 5B.
Figure 5B:
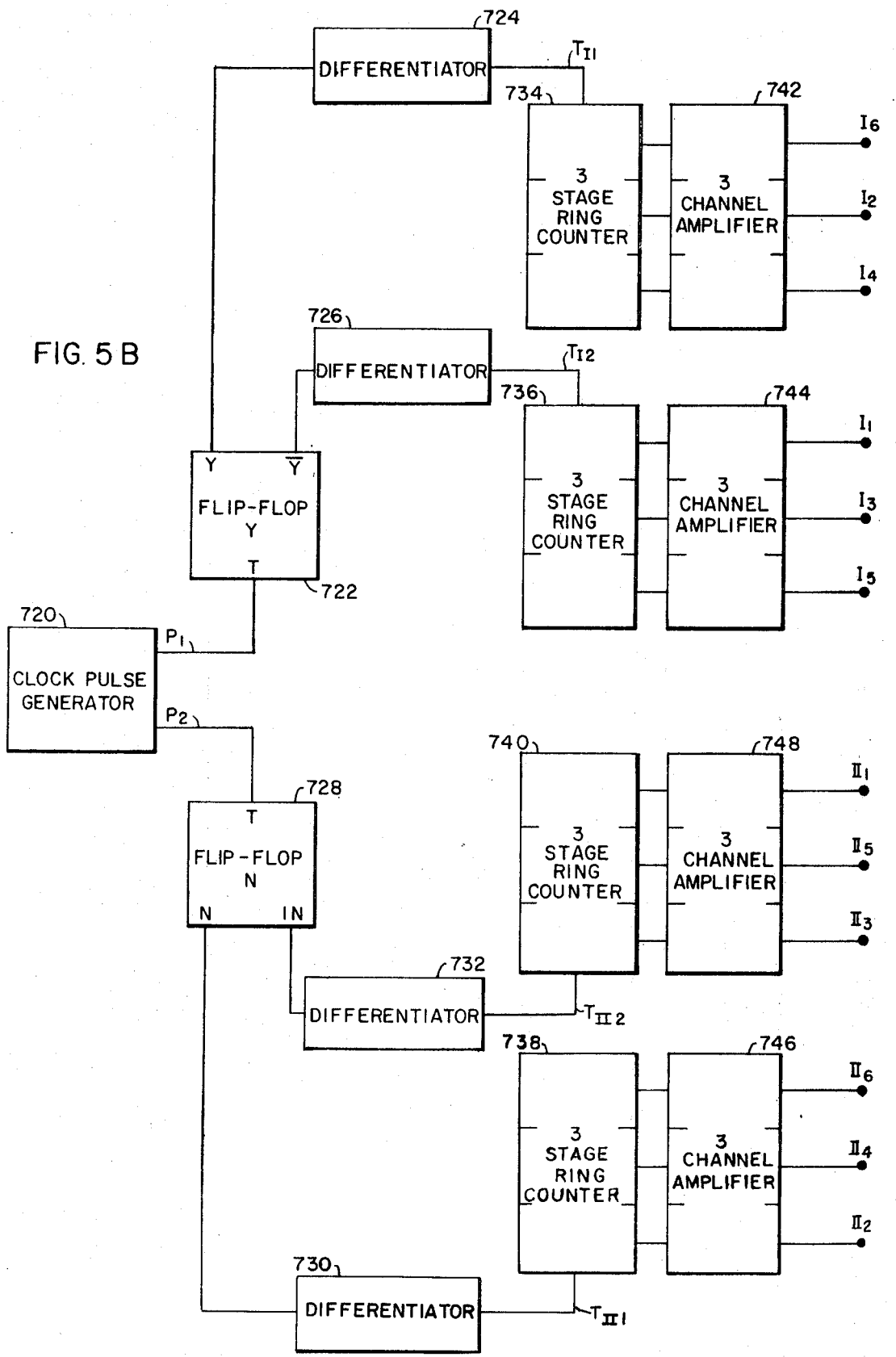
FIG. 5B is a block diagram of a control circuit for a six pulse frequency changer system of the type illustrated in FIG. 5A.
Figure 6A:
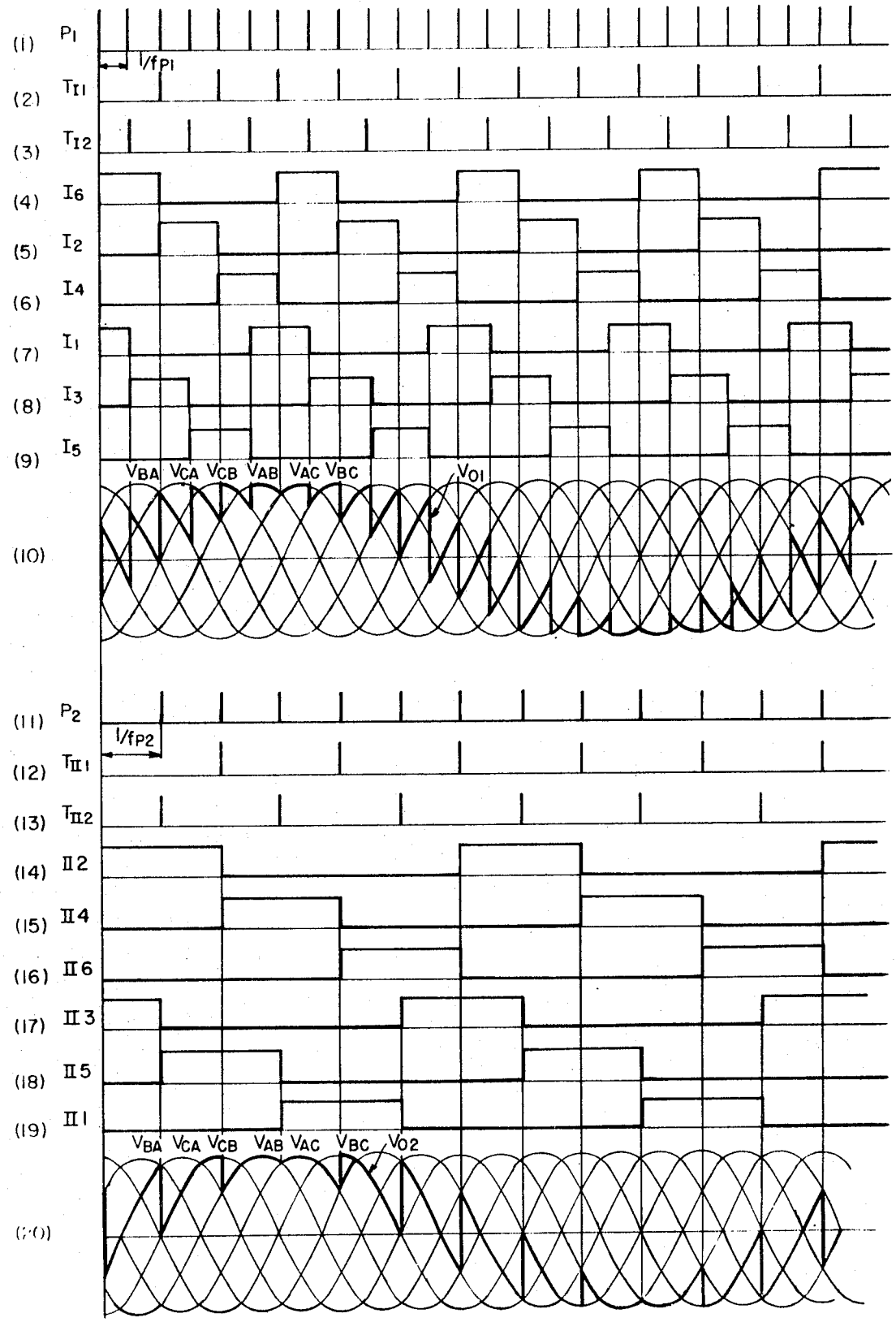

A six pulse bridge frequency changer system 60 is shown schematically in FIG. 5A and its operation is depicted in FIGS. 5B, 6A and 6B. The six pulse frequency changer system 60 is comprised of converters 62 and 64 each of which includes six bilateral switching elements QQ1 to QQ6. The converters 62 and 64 are supplied from a common input source G and are operatively coupled in parallel to electrical load L by interphase reactors 66 and 68. The ON-OFF control of the bilateral switching elements QQ is provided by control circuit 70. Control circuit 70 is shown in detail in FIG. 5B.

The operation of the six pulse frequency changer system 60 is similar to the three pulse system 20 previously described and is explained below with reference to FIGS. 5B and 6A.

The clock pulse generator 720 produces two strings of pulses, i $P_1$ and $P_2$, having frequencies of $f_{p1}$ and $f_{p2}$.

The wanted output frequency, $f_o$, and the clock frequencies $f_{p1}$ and $f_{p2}$ are related according to the following relationships;

$$f_o = f_{p1}/6 - f_I \qquad (12)$$

$$f_o = f_I - f_{p2}/6 \qquad (13)$$

where $f_I$ is the frequency of the input source. The two clock pulse trains may again be derived by a six pulse equivalent of the previously described sine wave crossing control shown in FIG. 4A. As illustrated in FIG. 6A, from both clock pulse trains $P_1$ and $P_2$ two new pulse trains $T_{I1}$, $T_{I2}$ and $T_{II1}$, $T_{II2}$ are derived by two "divide by two circuits" comprised of flip-flops 722 and 728, differentiators 724, 726 and 730, 732 respectively. Pulse trains $T_{I1}$, $T_{I2}$, $T_{II1}$ and $T_{II2}$ operate three-stage ring counters 734, 736, 738 and 740 respectively. The outputs of the ring counters are appropriately amplified by three channel amplifier circuits 742, 744, 746 and 748 to provide ON-OFF control signals I1 to I6 and II1 to II6. ON-OFF control signals I1 to I6 are fed to the control electrodes of the bilateral switching elements QQ1 to QQ6 employed in converter 62, and ON-OFF control signals II1 to II6 are fed to the control electrodes of the bilateral switching elements QQ1 to QQ6 employed in converter 64. The sequential operation of the bilateral switching elements of converter 62, established by the ON-OFF control signals I1 to I6, generates waveform $V_{o1}$ at the output terminals of converter 62 and the sequential operation of the bilateral switching elements of converter 64, established by the ON-OFF control signals II1 to II6, generates waveform $V_{o2}$ at the output terminals of converter 64 as illustrated in FIG. 6A. The output voltage waveform $V_o$ illustrated in FIG. 6B is obtained by combining through the interphase reactors 66 and 68 the two component waveforms $V_{o1}$ and $V_{o2}$.

Figure 7:
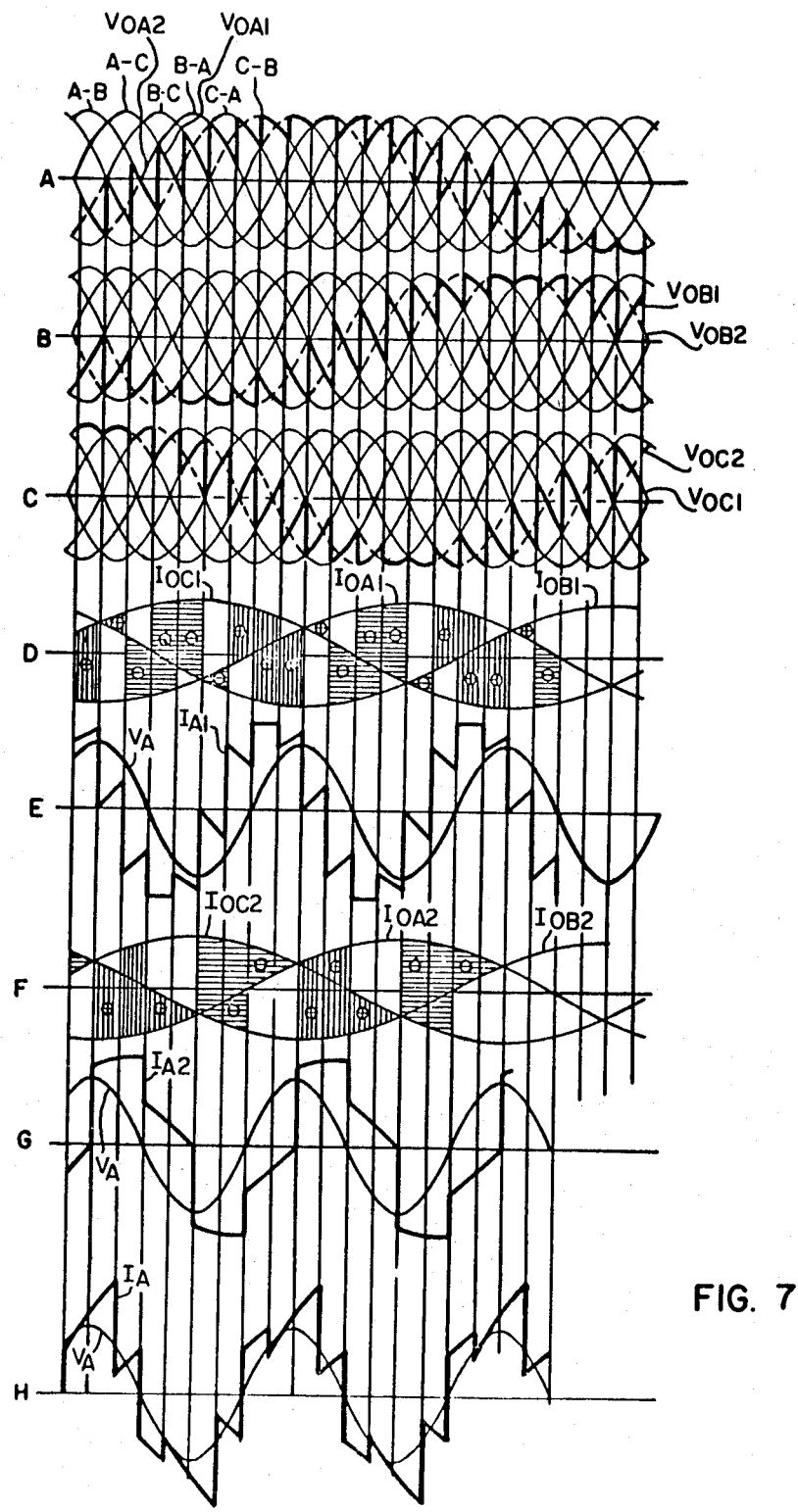
FIG. 7 is a graphical illustration of the operation of the six pulse frequency converter system of FIG. 5 according to the invention.

The above-described operation of the three phase bridge type frequency changer 60 of FIG. 5A results in a unity input displacement factor, i.e., the fundamental component of the current drawn from the input source G is in phase with the corresponding phase voltages regardless of the nature of the load L. The operation of this technique with regard to the input current wave and displacement factor for a typical three phase load is illustrated in FIG. 7. There is illustrated schematically in FIG. 8 an arrangement of three six pulse bridge frequency changers employed to generate a set of three output waveforms mutually displaced by 120°. It is well-known in the art of static frequency changers that the input displacement factor of any frequency changer system is independent of the number of output phases and therefore the description of the general case of three output phases is also applicable to the simpler case of a single output phase.

Figure 8:
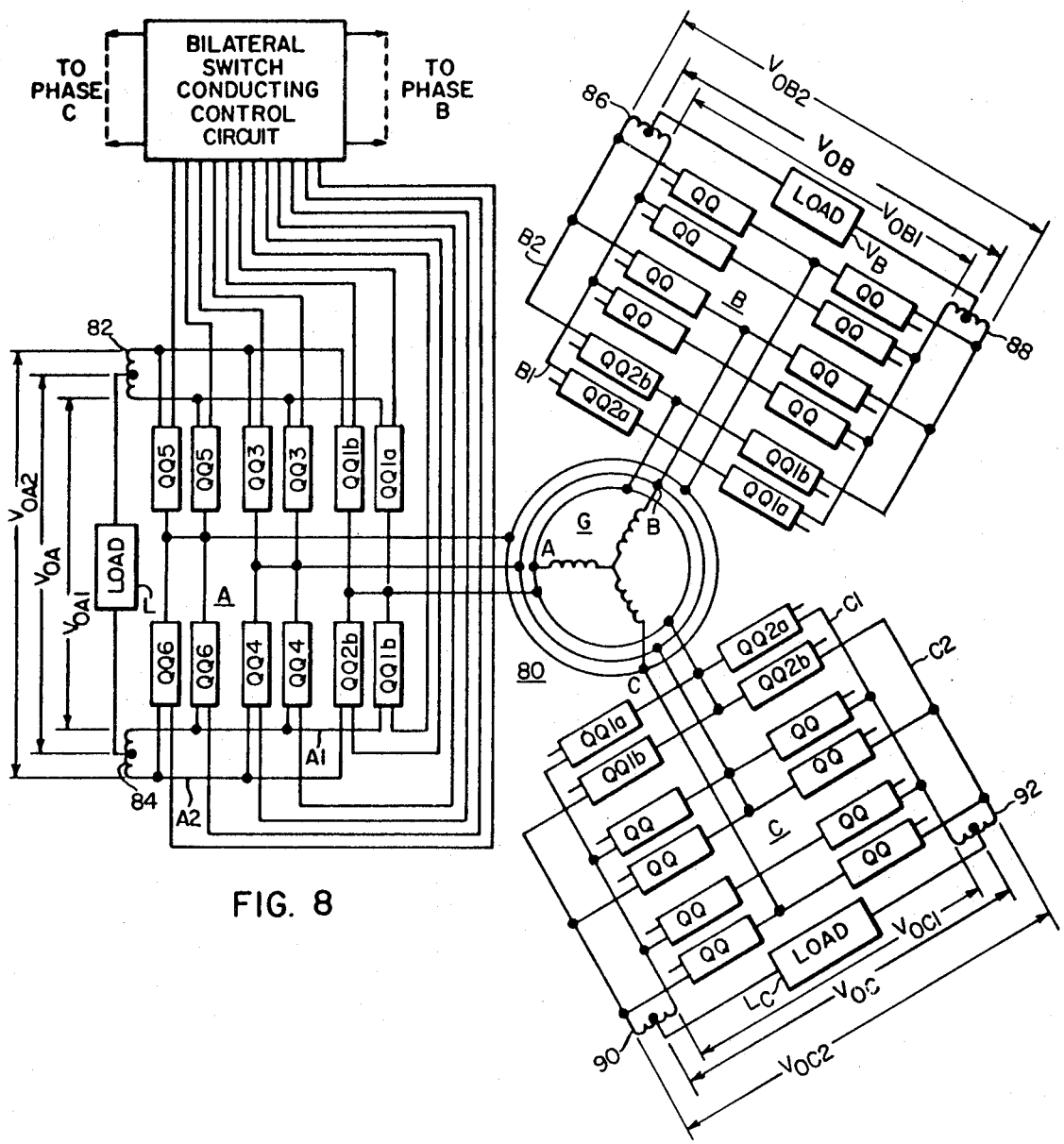
FIG. 8 is a schematic illustration of a three-phase output frequency changer system comprised of six-pulse bridge type frequency changers as illustrated in FIG. 5.

Referring to FIG. 8, the three frequency changer systems A, B and C, each comprising two converters employing bilateral switches, are operated from a common three phase input source G to develop the three output phase voltages $V_{OA}$, $V_{OB}$ and $V_{OC}$. Each of the frequency changer systems A, B, and C is comprised of two six pulse bridge converters, i.e., frequency changer system A is comprised of converters A1 and A2, frequency changer system B is comprised of converters B1 and B2, and frequency changer system C is comprised of converters C1 and C2. The outputs of converters A1 and A2, B1 and B2, and C1 and C2 are coupled through interphase reactors 82 and 84, 86 and 88, and 90 and 92, respectively to the three phase electrical loads $L_A$, $L_B$ and $L_C$. The configuration and operation of each frequency changer system is identical to the frequency changer system 70 of FIG. 5A with the exception that the generated output waveforms are mutually displaced by 120°. This displacement can be achieved for example by using three similarly displaced reference waveforms to generate the clock pulses to control the corresponding frequency changer systems. The three output voltage waveforms of the converters A, B1 and C1 operated at the switching frequency $f_{p1}$ are shown with continuous line in waveforms A, B and C of FIG. 7 while the three output voltage waveforms of the converters A2, B2 and C2 which are operated at the switching frequency $f_{p2}$ are shown with dashed lines in waveforms A, B and C. In waveform D the three output currents of the three converters A1, B1 and C1, supplied to loads LA, LB and LC, are illustrated as lagging the output voltages by 60°. The derived input current for phase A of the input power source G corresponding to the shaded portions of the respective output current of waveform D together with the supply phase voltage $V_A$ are shown in waveform E. Clearly the input current of the converter 62 leads the corresponding phase voltage by 60°. In waveform F the three output currents supplied by converters A2, B2 and C2 to the loads LA, LB and LC are illustrated. These currents, of course, are identical to the three output currents supplied by converters A1, B1 and C1 since each of the converters supplies half of the total load current. The derived input current for phase A drawn by converters A2, B2 and C2 is illustrated in waveform G together with the corresponding phase voltage $V_A$. It is apparent that the input current of these converters lags the input voltage by 60°. The sum of the two component input currents drawn by the converters A1, B1, C1 and A2, B2, C2 respectively, i.e., the input current drawn by the frequency changer system 80 from the phase A of input source G is shown in waveform H where phase supply voltage $V_A$ is shown for phase reference. Inasmuch as the result current illustrated in waveform H of FIG. 7 is in phase with the corresponding voltage it is apparent that the input displacement factor of the frequency changer system 60 is unity.

The frequency changer system 80 of FIG. 8 is suitable configurations for illustrating the alternate technique noted above for developing unity input displacement factor. A graphical representation of this alternate mode of operation is illustrated in FIGS. 9, 10A, 10B, 10C, 11A and 11B.

Three frequency changer systems A, B and C, each comprising two converters employing bilateral switches, are operated from a common three phase input power source G to develop the three output phase voltages $V_{OA}$, $V_{OB}$, and $V_{OC}$ respectively of the three phase frequency changer system 80. Inasmuch as the frequency changer systems A, B and C are identical in structure and operation for following description will be limited to the frequency changer A. The frequency changer system A is comprised of six pulse converters A1 and A2 the outputs of which are coupled through interphase reactors 82 and 84 to the electrical phase load L. While a circuit configuration of the frequency changer system A is identical to the frequency changer system 70 of FIG. 5A the control mode of operation of the bilateral switches QQ differs significantly. The control mode employed in this alternate technique for developing unity input displacement frequency changer operation results in the development of unity input displacement factor for each of the converters A1 and A2 of the frequency changer system A in contrast to the mode of operation described with reference to FIGS. 5 and 8 wherein the displacement factor of the individual converters was not unity but the combined operation of the converters resulted in a unity displacement factor for the frequency changer systems.

The alternate mode of operation is based on appropriately phase modulating the firing angles of the bilateral switches QQ in the converters A1 and A2 with respect to the phases of the supply voltages such that the mean output voltages of the converters A1 and A2 as illustrated in waveforms A and B are equal and the wave shapes of the outputs respectively, are such that the combination of these waveforms produces a waveform, as illustrated in waveform C, exhibiting minimal distortion. This relationship can be accomplished by any one of several suitable state of the art phase modulating techniques which can satisfy the following relationship for the firing angles of the converters A1 and A2:

$$\alpha_1 + \alpha_2 = 180°$$

where $\alpha_1$ is the firing angle of the converter A1, and $\alpha_2$ is the firing angle of the converter A2. These operative conditions likewise hold true for the frequency changer systems B and C.

It is to be noted that this method of basic control used for each converter of the frequency changer system A is essentially the same as that used for controlling the firing angles of naturally commutated cycloconverters. Thus, the existing control techniques such as the sine wave crossing method can be used to obtain the proper phase modulation of the frequency changers A1 and A2. It is noted however as will be apparent from the following discussion that the operation of the frequency changer system differs from that of the naturally commutated cycloconverter, in that the converters A1 and A2 of the frequency changer system A conduct during both the positive and negative half cycles of the total output cycle with each frequency changer continuously supplying half of the load current.

Figure 10A:
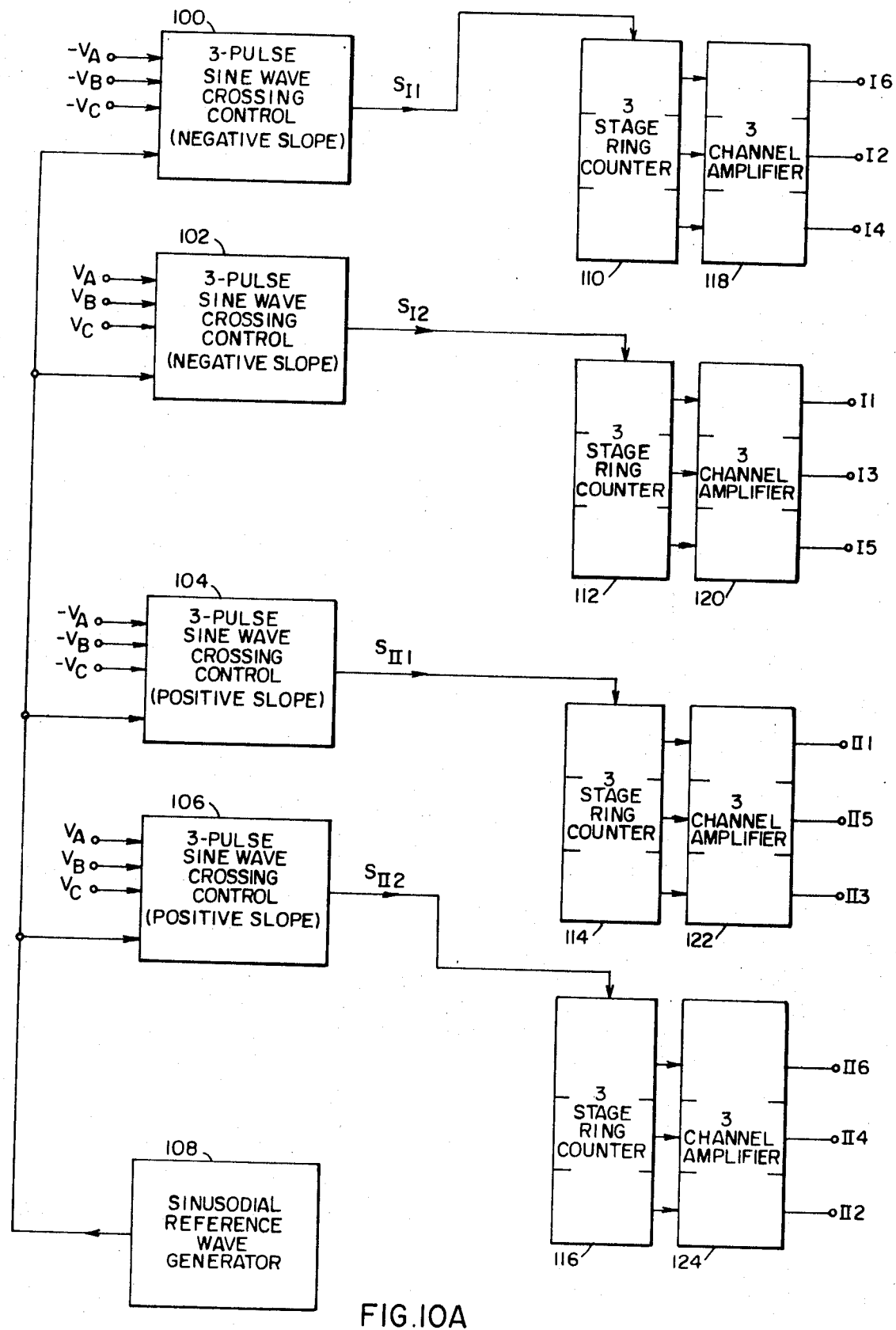
FIG. 10A is schematic illustration of a control circuit of the type used in the embodiment of FIG. 8.
Figure 10B:
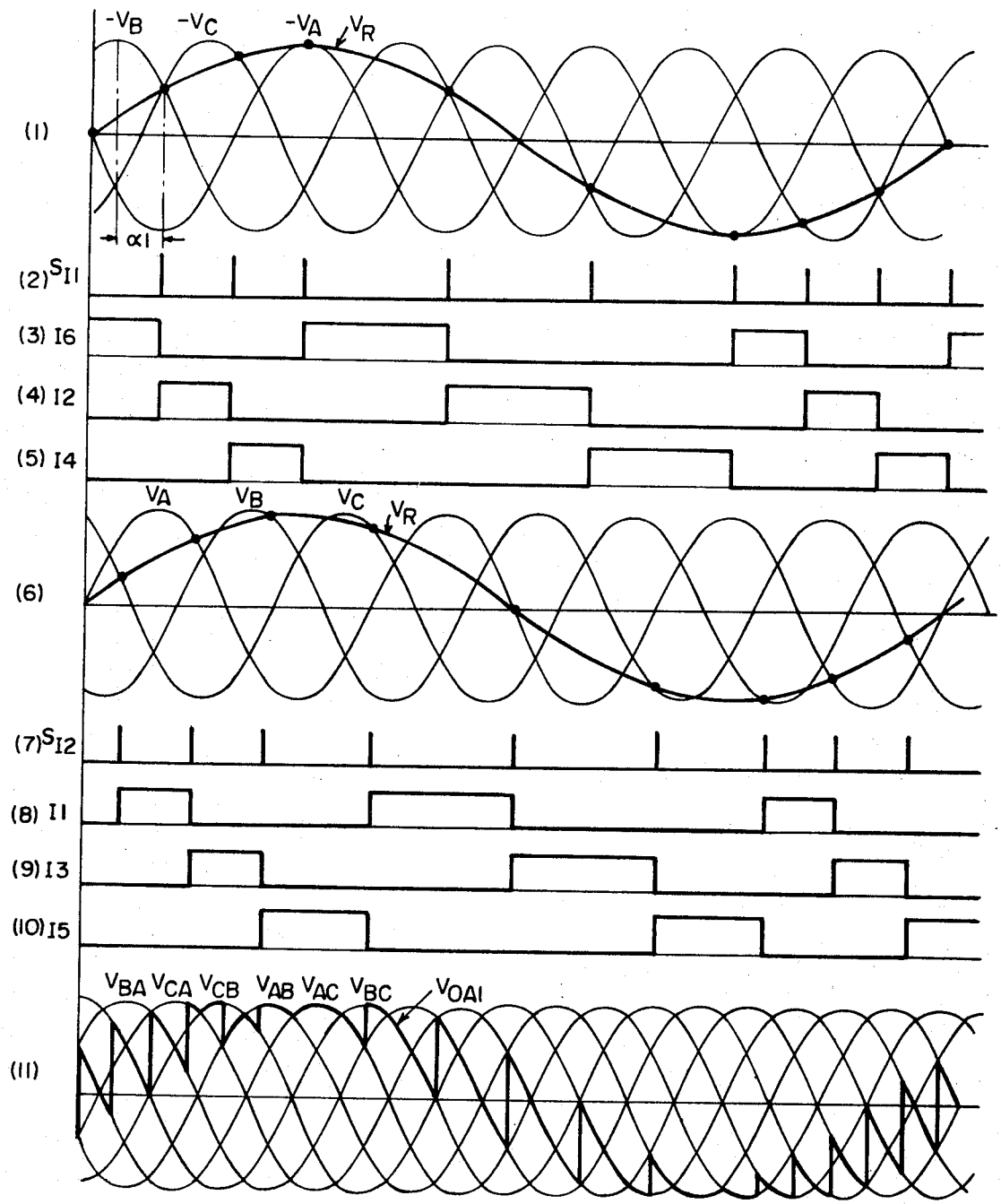
FIGS. 10B and 10C are waveform illustrations of the operation of the embodiments of FIGS. 8 and 10A.
Figure 10C:
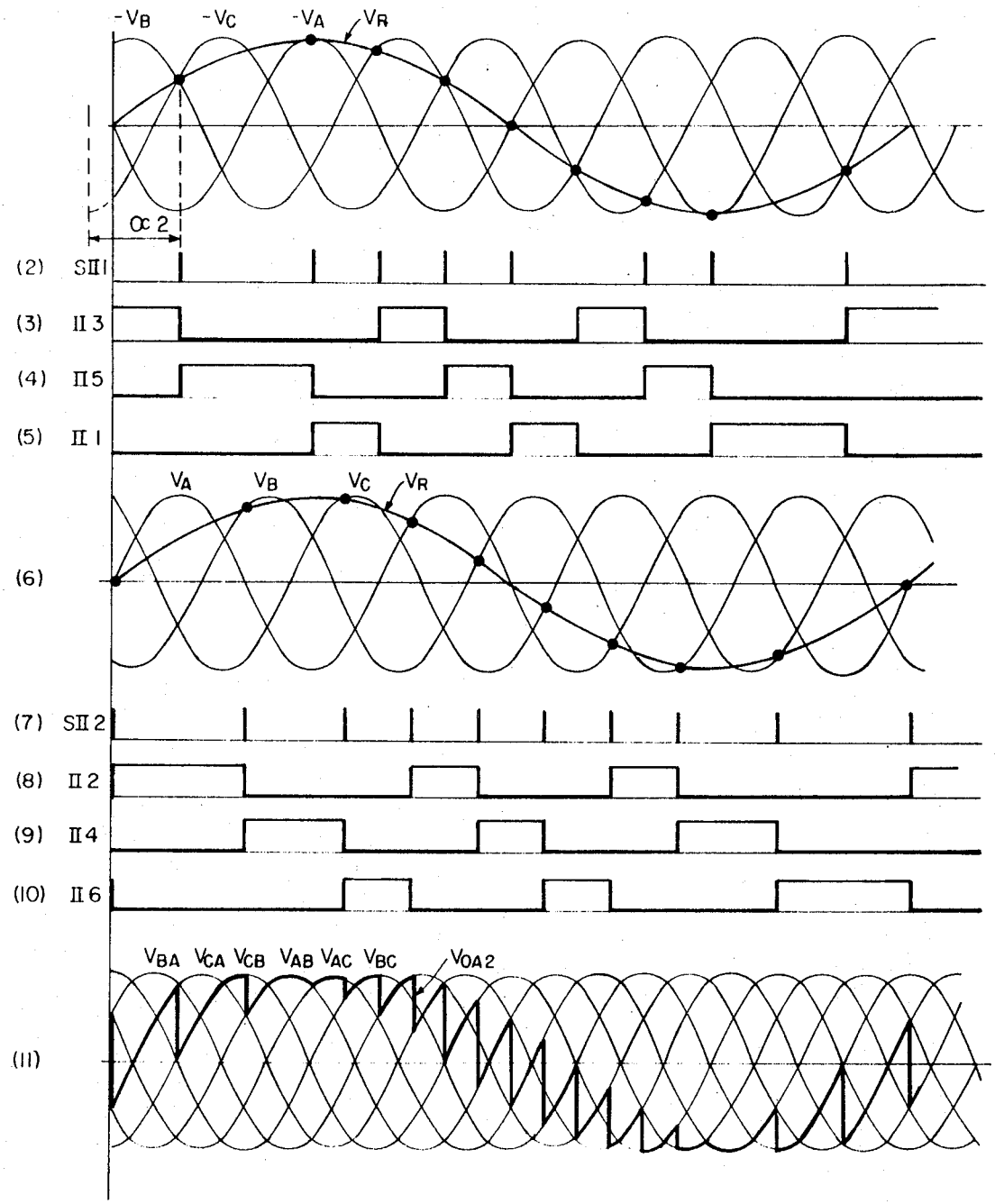

The conduction control circuit of the bilateral switching elements, utilizing again the previously discussed sine wave crossing method, is shown schematically in FIG. 10A and its operation is illustrated by the waveforms of FIGS. 10B and 10C. The conduction control circuit is comprised of a sinusoidal reference generator 108, four three-pulse sine wave crossing detector circuits 100, 102, 104 and 106, which are similar to those (330, 332) shown in detail in FIG. 4A, four three-stage ring counters 110, 112, 114 and 116 and four three-channel amplifiers 118, 120, 122 and 124. The sinusoidal timing waveforms, which are either in phase or in antiphase with the voltages of the a.c. source as specified in FIG. 10, and the reference waves are supplied to the sine wave crossing detector circuits 100–106. At the points of intersections of the reference wave with the negative slopes of the timing waves, the three-pulse sine crossing detector circuits 100 and 102 generate pulse trains $S_{I1}$ and $S_{I2}$ respectively. Pulse trains $S_{I1}$ and $S_I$ operate ring counter circuits 110 and 112 generating ON-OFF control signal waves I1 through I6. These control signals are appropriately amplified by amplifiers 118 and 120 and then fed to the control electrodes of the bilateral switching elements QQ1 through QQ6 of converter A1. The sequential operation of the bilateral switching elements, in accordance with the ON-OFF control signal waves I1 through I6 generates waveform $V_{OA1}$ at the output terminals of converter A1 as illustrated in FIG. 10B.

Similarly, at the points of intersection of the reference wave with the positive slopes of the timing waves, the three-pulse sine wave crossing detector circuits 104 and 106 generate pulse trains $S_{II1}$ and $S_{II2}$ respectively. Pulse trains $S_{II1}$ and $S_{II2}$ operate ring counter circuits 114 and 116 generating ON-OFF control signal waves II1 through II6. These control signals are appropriately amplified by amplifiers 122 and 124 and then fed to the control electrodes of the bilateral switching elements QQ1 through QQ6 of converter A2. The sequential operation of the bilateral switching elements, in accordance with the ON-OFF control signal waves II1 through II6, generates waveform $V_{OA2}$ at the output terminals of converter A2 as illustrated in FIG. 10C.

Figure 9:
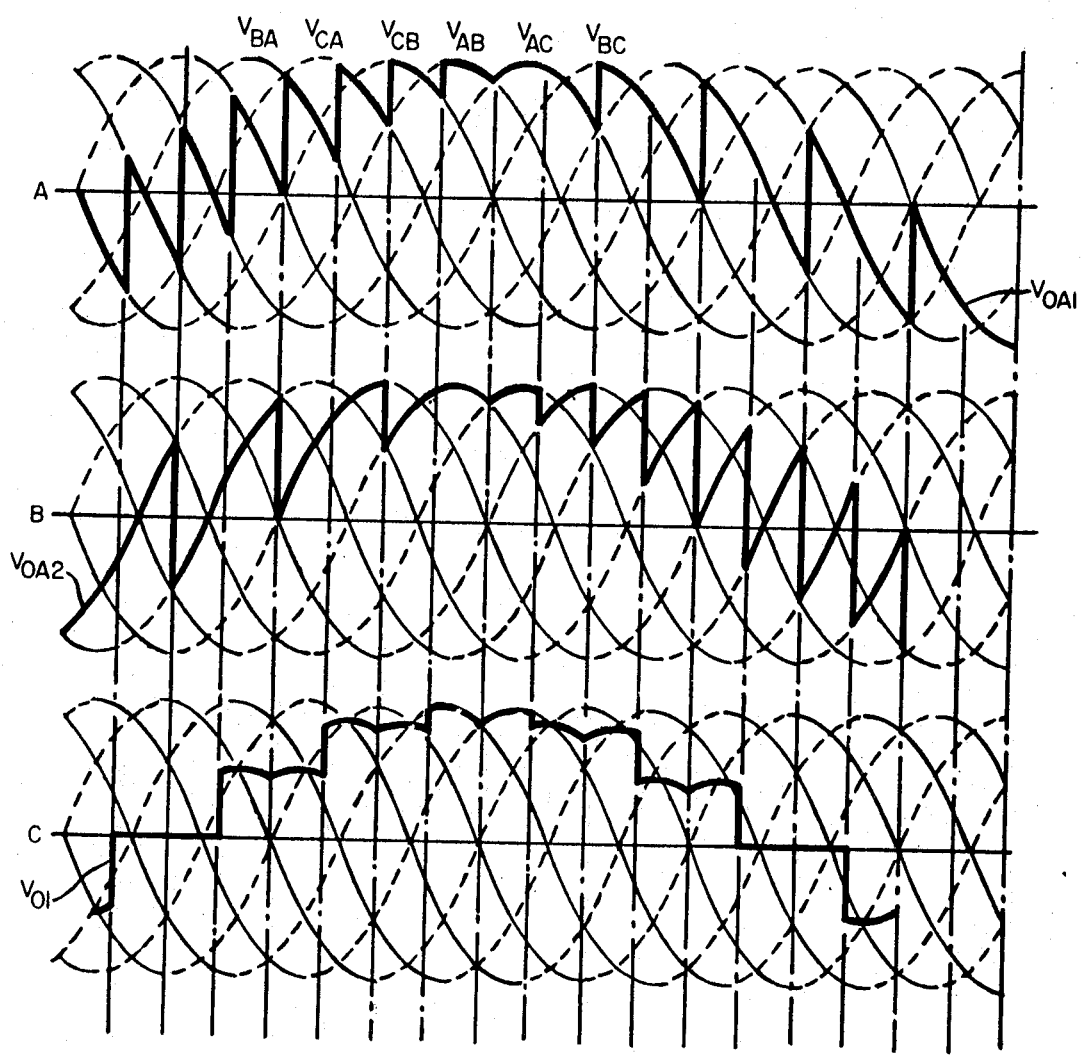
FIGS. 9A is a graphical illustration of the operation of the frequency changer system of FIG. 8 according to an alternate embodiment of the invention.

The output waveform $V_{OA}$ illustrated in FIG. 9 is obtained by combining through the interphase reactors 66 and 68, of the frequency changer system 80 shown in FIG. 8, the two component waveforms $V_{OA1}$ and $V_{OA2}$.

The operation of converters B1, B2 and C1, C2 of the frequency changer system 80 is identical to that of converter A1, A2 with the exception that the generated output waveforms are consecutively displaced by 120°. This displacement can be achieved by using three similarly displaced reference waveforms.

The above described operation of the three phase bridge type frequency changer system 80 of FIG. 8 results in a unity input displacement factor. In contrast to the previously described technique, where in input displacement factor of the individual converters was generally not unity, the above described system every individual converter has a unity input displacement factor regardless of the load displacement factor. The operation of the frequency changer system 80 with regard to the input current wave, for the case of phase modulated firing angle control of FIG. 10A, is illustrated in FIGS. 11A and 11B.

Figure 11A:
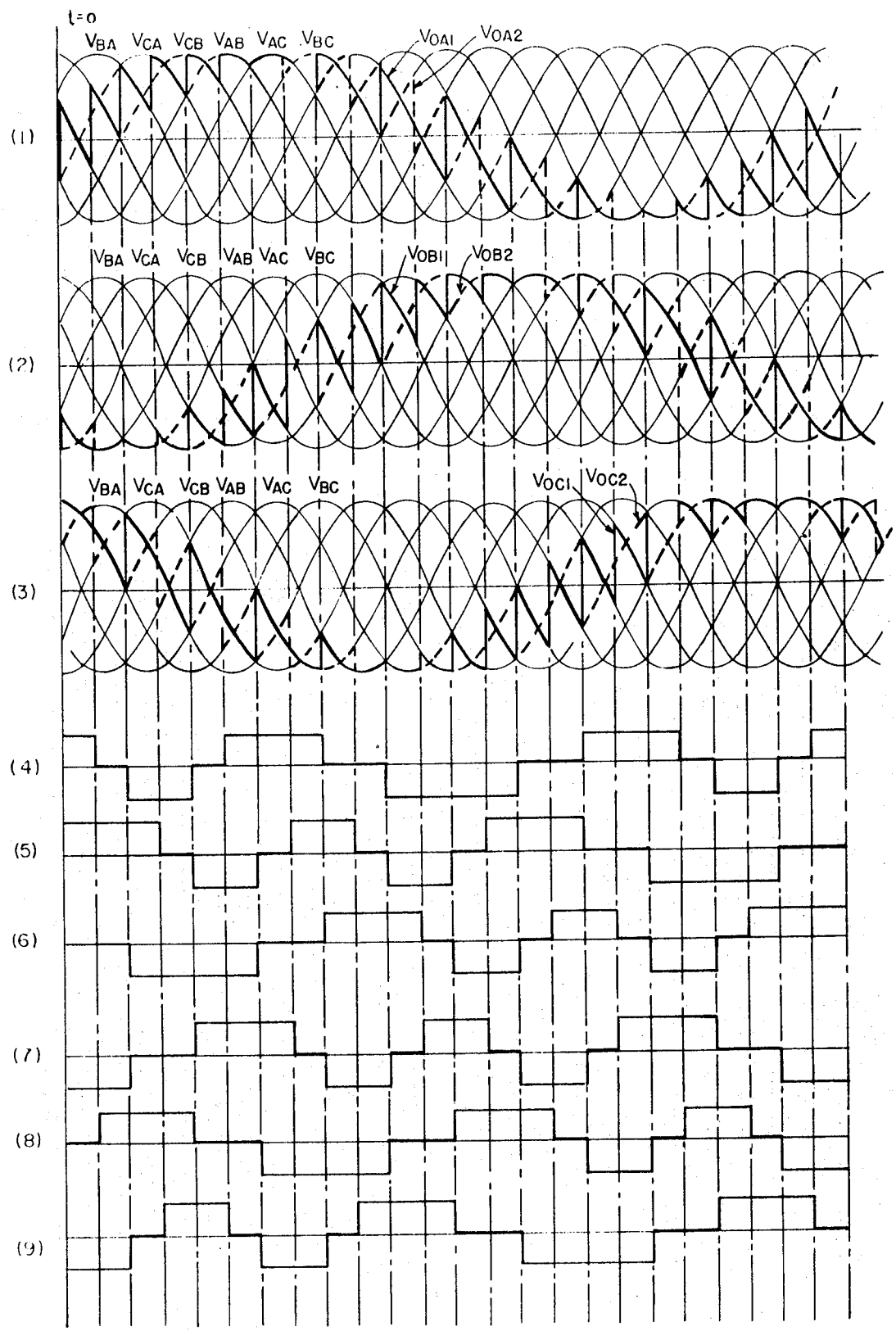
FIGS. 11A and 11B are waveform illustrations of an alternate mode of operation of the embodiment of FIG. 10A.
Figure 11B:
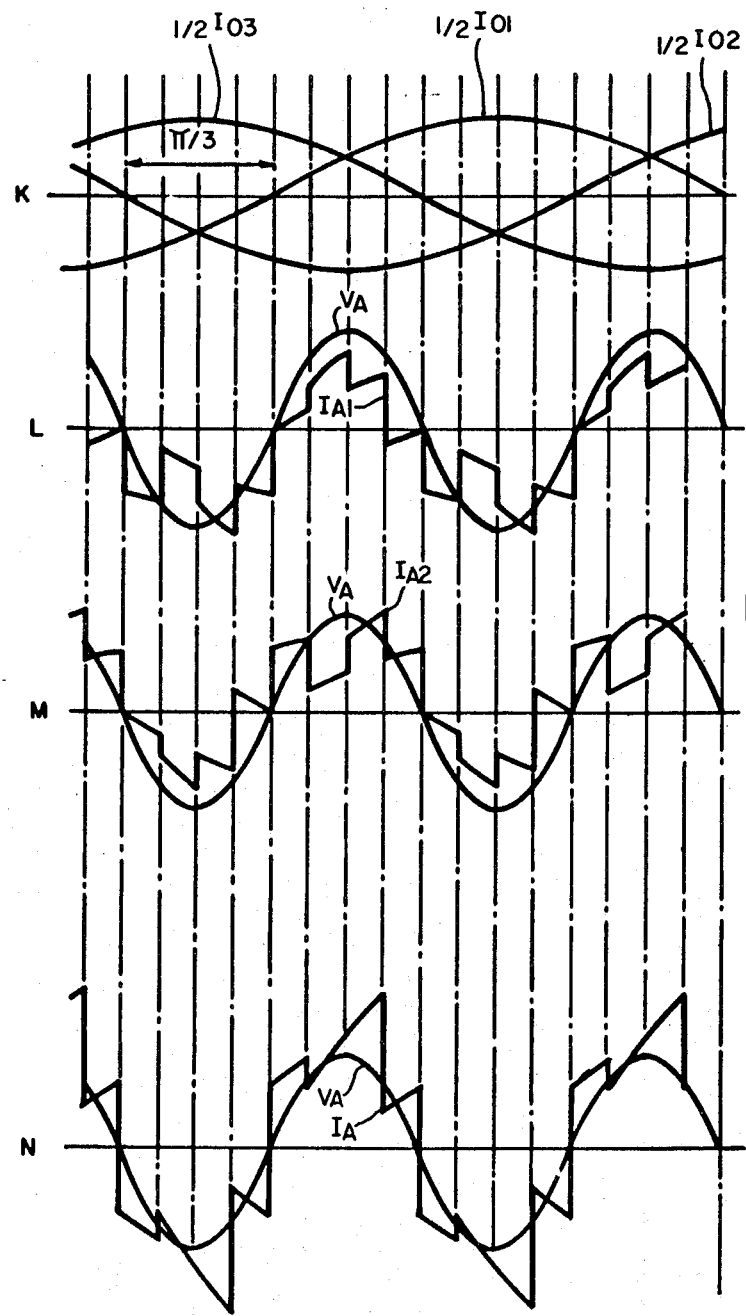

The waveforms of FIGS. 11A and 11B correspond to full output voltage operation of the frequency changer system 80. It is noted that at full output voltage the total input current wave shape developed by the alternate technique is identical to the total input current wave shape developed by the initial technique disclosed for accomplishing unity input displacement factor.

Waveforms A, B and C show the output waveforms $V_{OA1}$, $V_{OA2}$, $V_{OB1}$, $V_{OB2}$, $V_{OC1}$ and $V_{OC2}$ of the individual converters A1, A2, B1, B2, C1 and C2 respectively.

Waveforms E-J of FIG. 11A illustrate the conduction intervals of the bilateral switches of the frequency changer system 80 connecting loads to supply phase A of the input generator source G. Waveforms E-J are used to graphically derive the current segments drawn from the supply phase A. Consider for example that switch $QQ1_a$ of converter 1A is closed, then half of the load current from the output phase A is permitted to flow into the terminal point of the supply phase A. Then switch $QQ2_a$ is closed and half of the load current flows from the terminal point of the supply phase A. Therefore in waveform E the positive intervals of the waveform represent the conduction intervals of switch $QQ1_a$ and the negative intervals represent the conduction period of switch $QQ2_a$. The zero intervals of the waveform E indicate that neither bilateral switch $QQ1_a$ nor $QQ1_b$ is conducting. Waveform H similarly indicates the conduction intervals of bilateral switching elements $QQ2_a$ and $QQ2_b$ of converter A2 which supply, during these conduction intervals, the other half of the load current in output phase A from supply phase A. The remaining waveforms F, G, I, J correspond similarly to the operation of the bilateral switches of frequency changer systems B and C which connect the outputs of B and C to supply phase A.

Waveform K of FIG. 11B illustrates the three output currents supplied by each of the coupled converters comprising the frequency changer systems A, B and C. The output currents are assumed to be sinusoidal (which is nearly true in most practical applications) and it is also assumed that the currents lag the output voltage by 60° as was the case in the above description of the first technique for developing unity displacement input factor for frequency changer systems. Waveforms L and M show the combined currents drawn from the input power source G, by the converters A1, B1, C1 and the converts A2, B2 and C2 respectively. Note that the current drawn by either of the above-identified converter groups is in phase with the corresponding supply voltage thereby establishing a unity input displacement factor for each. It is therefore concluded that each frequency changer system draws from the input power source only that current required to supply the real portion of the output power, i.e. the power that is actually consumed by the load L. The input current to the dual frequency changers is a function of the real output power and is independent of the output KVA. The input displacement factor of each of the frequency changer systems A, B and C is therefore maintained at unity regardless of the load power factor.

Waveform N illustrates the total current drawn from the input supply phase A of the input power source G. Since each of the converters of the frequency changer systems A, B and C exhibits a unity input displacement factor it is evident that the combination of the converters A1 and A2, B1 and B2, C1 and C2 results in a frequency changer system exhibiting reduced distortion as well as a unity input displacement factor.

I claim:

1. An AC to AC frequency changer apparatus for developing an AC output voltage waveform across a load, comprising, in combination, an AC input power source, a converter circuit means including a plurality of ON-OFF conduction controlled bilateral switching means operatively connected between said AC input source and said load, each of said bilateral switching means being capable of conducting current in both directions between said input power source and said load, phase modulation conduction control circuit means operatively connected to said ON-OFF conduction controlled bilateral switching means to control the ciring angles of said bilateral switching means and sequentially render conductive said bilateral switching means in phase relationship with the alternating voltage supplied by said AC input power source, said bilateral switching means developing said AC output voltage waveform across said load, said bilateral switching means being rendered conductive by said phase modulation control conduction circuit means during both the positive and negative half cycles of the AC current flowing in said load such that the current drawn from said AC input power source is in phase with the corresponding phase voltage of said AC input power source thereby establishing a unity input displacement factor for said converter circuit means.

2. Apparatus as claimed in claim 1 wherein said converter circuit means includes a first converter circuit and a second converter circuit, said phase modulation control conduction circuit means providing phase modulated ON-OFF conduction control of the bilateral switching means of said first and second converter circuits with respect to the alternating voltage supply by said AC input power source to develop intermediate first and second output voltage waveforms respectively, said bilateral switching means of said first and second converter circuits being rendered conductive by said phase modulation control conduction circuit means during both the positive and negative half cycles of the AC output current flowing in said load to establish a unity input displacement factor for both said first and second converter circuits, said phase modulation control circuit maintaining the sum of the firing angles of said first and second converter circuit at approximately 180°, and means for combining the outputs of said first and second converter circuits, said combination resulting in reduced distortion of the current drawn from the AC input power source and reduced distortion of the AC output voltage waveform while maintaining the unity input displacement factor for said converter circuit means.

3. An AC to AC frequency changer apparatus as claimed in claim 1 wherein the average variation of the phase angle over a full output cycle established by said phase modulation conduction controlled circuit means is approximately zero.

* * * * *

UNITED STATES PATENT OFFICE
CERTIFICATE OF CORRECTION

PATENT NO. : 3,707,666
DATED : December 26, 1972
INVENTOR(S) : Laszlo Gyugyi

It is certified that error appears in the above-identified patent and that said Letters Patent are hereby corrected as shown below:

Column 1, line 24 cancel "independent of" and substitute -- whatever may be --;

Column 1, line 27, insert -- and -- before "such";

Column 1, line 30, cancel "as" and substitute -- is --;

Column 1, line 33, cancel "3,493,833" and substitute -- 3,493,838;

Signed and Sealed this ninth Day of March 1976

[SEAL]

Attest:

RUTH C. MASON
Attesting Officer

C. MARSHALL DANN
Commissioner of Patents and Trademarks